United States Patent [19]

Vandervoort

[11] Patent Number: 4,754,665
[45] Date of Patent: Jul. 5, 1988

[54] AUXILIARY TRANSMISSION SECTION

[75] Inventor: John R. Vandervoort, Richland, Mich.

[73] Assignee: Eaton Corporation, Cleveland, Ohio

[21] Appl. No.: 826,430

[22] Filed: Feb. 5, 1986

[51] Int. Cl.⁴ .......................... F16H 3/02; F16H 3/08
[52] U.S. Cl. .......................................... 74/745; 74/331
[58] Field of Search ........................... 74/745, 331, 339

[56] References Cited

U.S. PATENT DOCUMENTS

| | | | |
|---|---|---|---|
| 2,637,221 | 5/1953 | Backus et al. | 74/745 |
| 2,637,222 | 5/1953 | Backus | 74/745 |
| 2,667,955 | 2/1954 | Bixby | 192/53 A |
| 3,001,413 | 9/1961 | Burckhardt | 74/359 |
| 3,105,395 | 10/1963 | Perkins | 74/745 |
| 3,265,173 | 9/1966 | Russell | 192/67 R |
| 3,283,613 | 11/1966 | Perkins | 74/745 |
| 3,648,546 | 3/1972 | McNamara et al. | 74/745 |
| 3,799,002 | 3/1974 | Richards | 74/745 |
| 3,802,293 | 4/1974 | Winckler | 74/745 |
| 3,983,979 | 10/1976 | Richards | 74/339 X |
| 4,125,179 | 11/1978 | Cochran et al. | 192/53 E |
| 4,290,515 | 9/1981 | Bogema et al. | 192/53 C |
| 4,388,838 | 6/1983 | Richards et al. | 84/331 |
| 4,388,843 | 6/1983 | Teeter | 74/745 |
| 4,440,037 | 4/1984 | Foxton et al. | 74/745 |
| 4,462,489 | 7/1984 | Morscheck | 74/339 |
| 4,527,447 | 7/1985 | Richards | 74/745 |

FOREIGN PATENT DOCUMENTS

| | | |
|---|---|---|
| 0071353 | 2/1983 | European Pat. Off. . |
| 0110538 | 6/1984 | European Pat. Off. ............... 74/730 |
| 2010419 | 6/1979 | United Kingdom . |
| 2103315 | 2/1983 | United Kingdom .................. 74/745 |

OTHER PUBLICATIONS

Small Scale Print No. 016-AD; Fuller Transmissions; Eaton Corp., Mar. 1981.

Primary Examiner—Lawrence Staab
Assistant Examiner—David Novais
Attorney, Agent, or Firm—D. A. Rowe; H. D. Gordon

[57] ABSTRACT

An auxiliary transmission section (102) for a compound transmission (100) is provided having three gear layers, combined range and splitter gearing and four distinct selectable auxiliary section ratios. The auxiliary transmission section includes an auxiliary section input shaft (28A), an output shaft (122), an auxiliary countershaft assembly (104), splitter (118), splitter/range (120) and range (124) gears, a two-position splitter clutch (126) rotationally fixed to the auxiliary section input shaft for coupling either the splitter gear or splitter/range gear to the auxiliary section input shaft and a two-position synchronized range clutch (128) rotationally fixed to the output shaft for coupling either the range/splitter gear or the range gear to the output shaft.

17 Claims, 7 Drawing Sheets

| RATIO NO. | HIGH RANGE | LOW RANGE |
|---|---|---|
| 16 | 0.86 | |
| 15 | 1.00 | |
| 14 | 1.16 | |
| 13 | 1.35 | |
| 12 | 1.56 | |
| 11 | 1.82 | |
| 10 | 2.10 | |
| 9 | 2.46 | |
| 8 | | 2.84 |
| 7 | | 3.36 |
| 6 | | 3.88 |
| 5 | | 4.54 |
| 4 | | 5.25 |
| 3 | | 6.12 |
| 2 | | 7.07 |
| 1 | | 8.26 |
| Lo | | 13.08 |
| LoLo | | 15.17 |

| RATIO NO. | MAIN SECTION GEAR ENGAGED TO MAINSHAFT | GEAR ENGAGED BY CLUTCH 126 | GEAR ENGAGED BY CLUTCH 128 |
|---|---|---|---|
| LoLo | 56 | 120 | 124 |
| Lo | 56 | 118 | 124 |
| 1 | 54 | 120 | 124 |
| 2 | 54 | 118 | 124 |
| 3 | 52 | 120 | 124 |
| 4 | 52 | 118 | 124 |
| 5 | 50 | 120 | 124 |
| 6 | 50 | 118 | 124 |
| 7 | 24 | 120 | 124 |
| 8 | 24 | 118 | 124 |
| 9 | 54 | 120 | 120 |
| 10 | 54 | 118 | 120 |
| 11 | 52 | 120 | 120 |
| 12 | 52 | 118 | 120 |
| 13 | 50 | 120 | 120 |
| 14 | 50 | 118 | 120 |
| 15 | 24 | 120 | 120 |
| 16 | 24 | 118 | 120 |
| $R_{LO}$ | 58 | 120 | 124 |
| $R_H$ | 58 | 120 | 120 |

AUXILIARY TRANSMISSION SECTION

BACKGROUND OF THE INVENTION

1. Field of the Invention

The present invention relates to compound transmissions having multispeed auxiliary transmission sections connected in series with a multispeed main transmission sections and providing both splitter and range type shifting.

2. Prior Art

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) speed main section connected in series with a three (3) speed auxiliary section will provide twelve (4×3=12) available ratios.

Auxiliary transmission sections are of three general types: range type, splitter type or combined range/splitter type.

In compound transmissions having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference and to publication Small Scale Print No. 016-AD; Fuller Transmissions; Models RT-14613, RTO-14613, RTOO-14613, published March 1981 by Eaton Corporation, assignee of this invention, the disclosure of which is hereby incorporated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

The prior art compound change gear transmissions of the type having both range and splitter type auxiliary section gearing, such as the "Roadranger" type offered by Eaton Corporation and the "Ecosplit" type offered by Zahnradfabrik Friedrichshafen Aktiengesbushaft, are well received and widely used in manually shifted heavy duty vehicles. However, these and other types of prior art compound change gear transmissions are not totally satisfactory as all of the ranges could not be split, rather complicated shifting procedures were required for certain types of shifts, splitter clutches required synchronizing mechanisms and/or master clutch interlocks were required to protect the range and/or splitter clutch synchronizers.

SUMMARY OF THE INVENTION

In accordance with the present invention, the drawbacks of the prior have been overcome to the extent that a three-layer, four-speed auxiliary transmission section for connection in series behind a main transmission section, and providing both splitter and range type gearing, is provided. The improved auxiliary section requires synchronized clutches for only the double acting range clutch and requires no master clutch interlock.

The above is accomplished by providing an auxiliary section connected in series with the mainsection output shaft (i.e. the transmission mainshaft). The auxiliary section includes three clutchable gears, each constantly meshed with one of three auxiliary countershaft gears to define the three gear groups or layers, and an output shaft. A two-position nonsynchronized splitter clutch is shiftable to clutch either the first or second clutchable gear to the mainshaft while a two position synchronzed range clutch is shiftable to clutch either the second or third clutchable gear to the output shaft.

Accordingly, it is an object of the present invention to provide a new and improved three-layer, four-speed auxiliary transmission section of the combined range and splitter type for a compound change gear transmission.

This and other objects and advantages of the present invention will become apparent from a reading of the detailed description of the preferred embodiment taken in connection with the attached drawings.

DESCRIPTION OF THE EMBODIMENT

Figure 1:
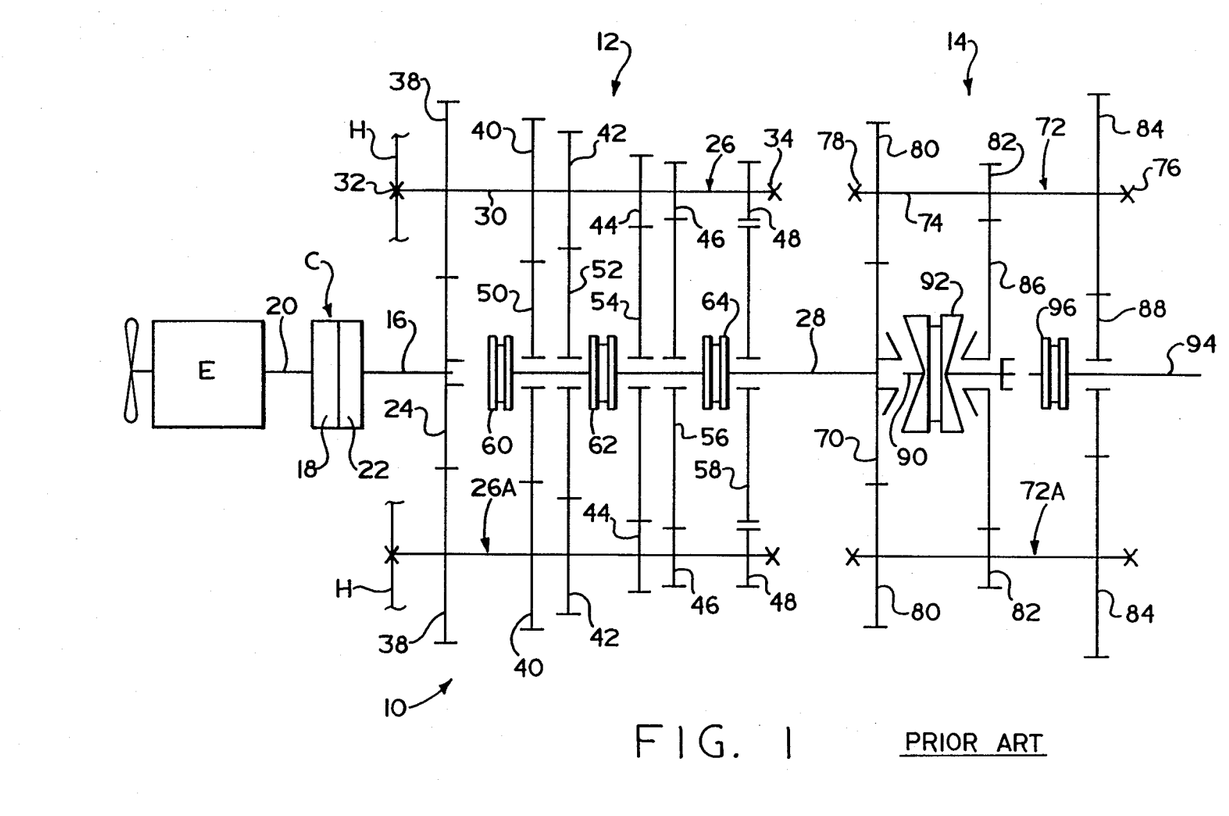
FIG. 1 is a schematic illustration of compound transmission utilizing a prior art type combined range and splitter auxiliary section.

Certain terminology wil be used in the following description for convenience only and will not be limiting. The words "upwardly", "downwardly", "rightwardly" and "leftwardly" will designate directions in the drawings to which reference is made. The words "forward" and "rearward" will refer respectively to the front and rear ends of the transmission as conventionally mounted in the vehicle, being respectively to the left and right sides of the transmission as illustrated in FIG. 1. The words "inwardly" and "outwardly" will refer to directions toward and away from, respectively, the geometric center of the device and designated parts thereof. Said terminology include the words above specifically mentioned, derivatives thereof and words of similar import.

The term "compound transmission" is used to designate a change speed or change gear transmission having a main transmission section and an auxiliary transmission section connected in series whereby the selected gear reduction in the main transmission section may be compounded by further selected gear reduction in the auxiliary transmission section. The term "upshift" as used herein shall mean the speed gear ratio. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e., a set of gears having a higher ratio of reduction of output shaft speed relative to the speed of the input shaft. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substatially synchronous speed.

Referring now to FIG. 1, there is schematically illustrated a well known and highly commercially successful thirteen-speed compound transmission 10. Transmission 10 comprises a main transmission section 12 connected in series with an auxiliary transmission section 14 having both range and splitter type gearing. Typically, transmission 10 is housed within a single housing and includes an input shaft 16 driven by a prime mover such as diesel engine E through a selectively disengaged, normally engaged friction master clutch C having an input or driving section 18 drivingly connected to the engine crank shaft 20 and a driven portion 22 rotatably fixed to the transmission input shaft 16.

In the main transmission section 12, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are hereby incorporated by reference. Typically, clutch collars 60, 62 and 64 are axially positioned by means of shift forks (not illustrated) associated with a shift bar housing assembly (not illustrated) as well known in the prior art. Clutch collars 60, 62 and 64 are of the well known nonsynchronized double acting jaw clutch type.

It is understood that although the present invention and the prior art transmission 10 are illustrated as transmissions of the well known and commercially successful multiple identical countershaft, floating mainshaft and floating mainshift gear type, and while the auxiliary transmission section of the present invention is particularly well suited for such transmission structure, the advantages of the present invention are equally applicable to transmissions of the single countershaft or nonidentical multiple countershaft type.

Main section mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely, that ratio provided by drivingly connected mainshaft drive gear 56 to mainshaft 28, is often of such a high gear reduction as to be considered a low or "creeper" gear which is utilized only for starting of a vehicle under severe conditions and is usually not utilized in the high transmission range and/or may not be split in the low transmission range. Accordingly, while the main section 12 illustrated does provide five forward speeds, it is usually referred to as a "4+1" main section as only four of the forward speeds are compounded by the auxiliary transmission section 14.

Jaw clutches 60, 62 and 64 are three-position clutches in that they may be positioned in a centered, non-engaged position as illustrated or in a fully rightwardly engaged or in a fully leftwardly engaged position.

Prior art auxiliary transmission section 14 is connected in series with main transmission section 12 and is of the three-layer, three-spaced combined range/splitter type. Mainshaft 28 extends into the auxiliary section 14 and carries an auxiliary drive gear 70 fixed thereto, which auxiliary drive gear simultaneously drives a plurality of auxiliary section countershaft assemblies 72 and 72A at equal rotational speeds. Each of the auxiliary countershaft assemblies, 72 and 72A, comprises an auxiliary countershaft 74 supported by bearings 76 and 78 in housing H and carrying three auxiliary section countershaft gears 80, 82 and 84 fixed for rotation therewith. Auxiliary section countershaft gears 80 are constantly meshed with auxiliary drive gear 70 while auxiliary section countershaft gears 82 and 84, respectively, are constantly meshed with auxiliary driven gears 86 and 88, respectively. Auxiliary section driven gear 86 coaxially surrounds stub shaft 90 which is coaxial with mainshaft 28 and carries a synchronized sliding two-position synchronized clutch assembly 92 thereon. Auxiliary section driven gear 88 coaxially surrounds output shaft 94 which carries a two position slidable jaw clutch collar 96 thereon, which jaw clutch collar is substantially structurally and functionally identical to jaw clutch collars 60, 62 and 64 utilized in the main transmission section 12. Clutch assemblies 92 and 96 are both two position clutch assemblies, which may be selectively located in the rightwardmost or leftwardmost axial positions, but not normally in a centered non-engaged position therebetween. Typically, clutch assemblies 92 and 96 are axially positioned in a selected axial position by means of shift forks positioned by a remotely controlled fluid actuated piston assembly as is well known in the prior art.

Synchronized clutch assembly 92 may be removed to the leftwardmost position to drivingly couple auxiliary drive gear 70 and mainshaft 28 to auxiliary stub shaft 90 or may be selectively axially positioned in the rightwardmost position to selectively rotationally couple auxiliary driven gear 86 to auxiliary stub shaft 90. Sliding clutch collar 96 may be axially positioned in the leftwardmost position to rotationally couple stub shaft 90 to output shaft 94 or may be axially positioned in a rightwardmost position to rotationally couple auxiliary drive gear 88 to output shaft 94.

Auxiliary section countershaft gears 80 and auxiliary section drive gear 70 comprise a first gear layer, auxiliary section countershaft gears 82 and auxiliary section driven gear 86 comprise a second gear layer and auxiliary countershaft gears 84 and auxiliary section driven gear 88 comprise a third gear layer of the three gear layer auxiliary transmission section 14. As may be appreciated, when clutch collar 96 is in the rightwardmost position drivingly coupling auxiliary driven gear 88 to output shaft 94, mainshaft 28 will drive the output shaft 94 through auxiliary drive gear 70, auxiliary countershaft gear 80, auxiliary countershaft gear 84 and auxiliary drive gear 88 regardless of the position of synchronized clutch assembly 92 and thus the three-gear-layer auxiliary transmission section 14 provides a maximum of three selectable ratios.

Figure 1A:
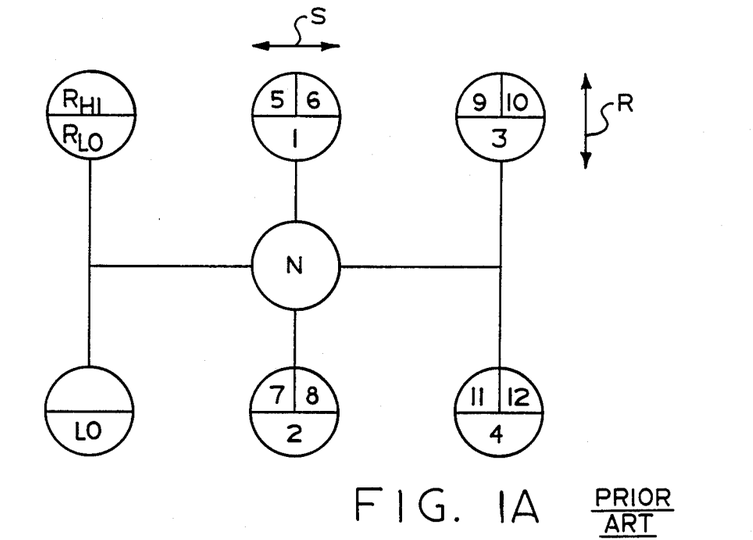
FIG. 1A is a schematic illustration of the shift pattern for the transmission of FIG. 1

Synchronized clutch assembly 92 is the range shift clutch utilized for making range shifts in the auxiliary section while sliding jaw clutch collar 96 is the splitter clutch utilized for making splitter shifts in the auxiliary section. The shift pattern for shifting the thirteen-speed compound transmission 10 may be seen by reference to FIG. 1A wherein divisions in the vertical direction illustrated by arrow R represent range shifts while divisions in the horizontal direction represented by arrow S represent splitter shifts. Disregarding the low gear position, it is noted that each of the shift lever positions provides three selectable ratios as the low range cannot be split due to the auxiliary section 14 only providing three distinct selectable ratios between the mainshaft 28 and output shaft 94.

Output shaft 94 is normally drivingly coupled to a vehicle's drive wheels by means of a transfer case and/or drive axle mechanism, as is well known in the prior art, and thus is well grounded. In certain circumstances, synchronized clutch assembly 92 is required to reduce the rotational speed of the mainshaft 28 and all of the gears, shafts and clutch members rotating therewith to the speed of the stub shaft 90. If, however, a compound range and splitter shift has been attempted in improper sequence wherein sliding clutch collar 96 is not engaged in either its rightward or leftwardmost positions when synchronized clutch assembly 92 is in a shift transient, stub shaft 90 will be ungrounded and thus have extremely low inertia relative to the greater inertia of the mainshaft and all members rotationally fixed thereto. The synchronized clutch assembly 92 will assume the speed of the largest rotational inertia, which with an ungrounded stub shaft is mainshaft 28, and thus the speed of the mainshaft 28 and its related gearing and clutch members will not be changed by the synchronized clutch as required. Accordingly, the splitter clutch 96 should be in one of its two engaged positions to ground the synchronized clutch 92 whenever a range shift is attempted. When the synchronizer clutch assembly 92 cannot cause required synchronizing action due to being ungrounded, the engaging surfaces of the jaw clutch assemblies are required to perform this task, for which they are not intended, resulting in much longer than desirable shifting times and much greater than desirable wear of the jaw clutch assemblies.

Figure 2:
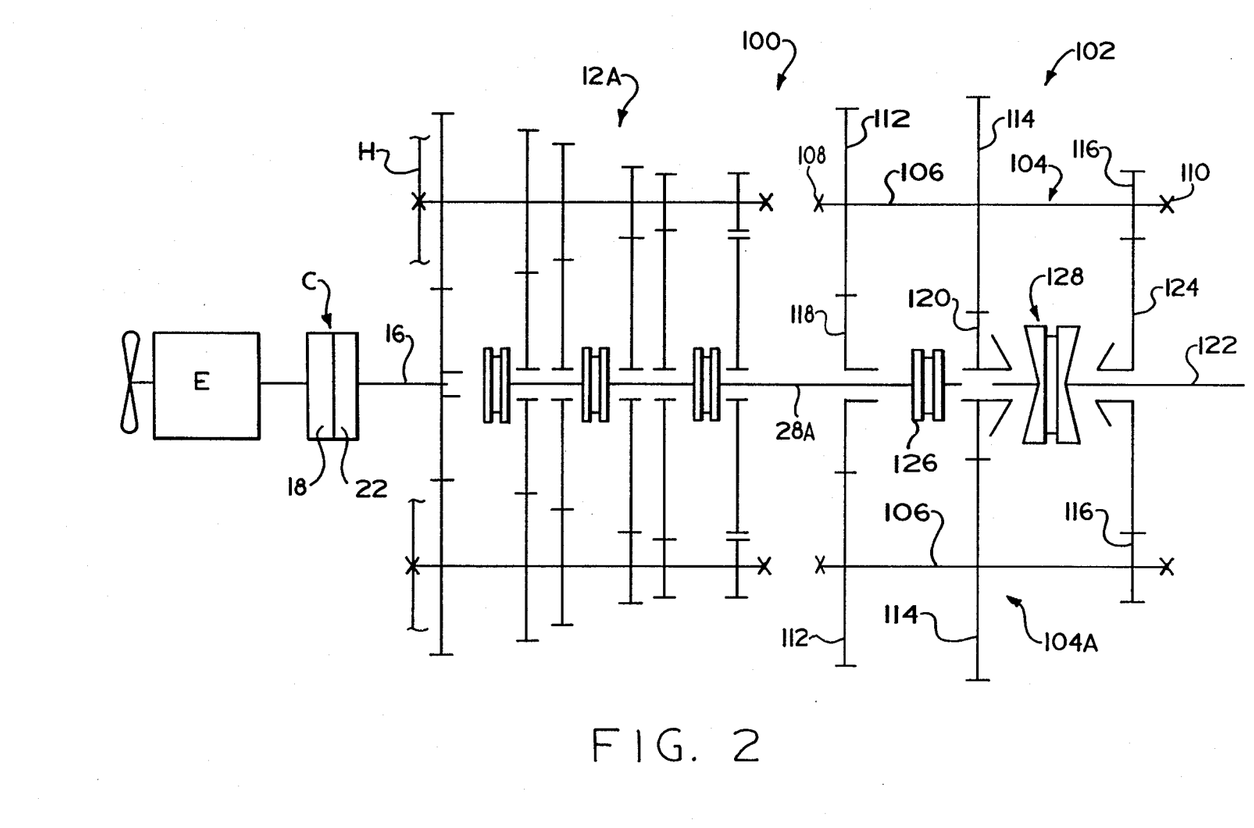
FIG. 2 is a schematic illustration of a compound transmission utilizing the auxiliary section of the present invention.
Figure 3A:
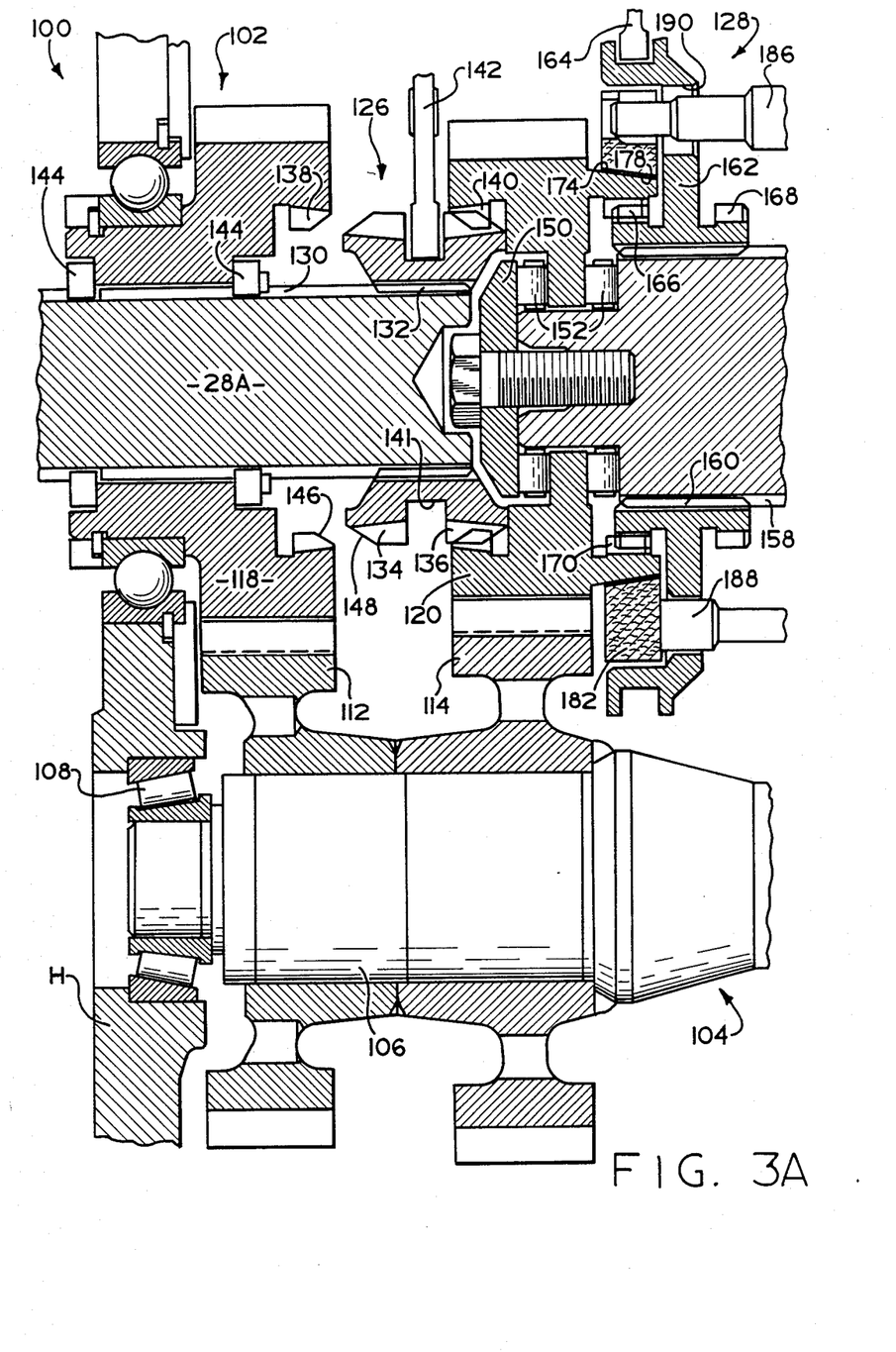
FIGS. 3A and 3B are a plan view, in section, of the auxiliary section of this present invention.
Figure 3B:
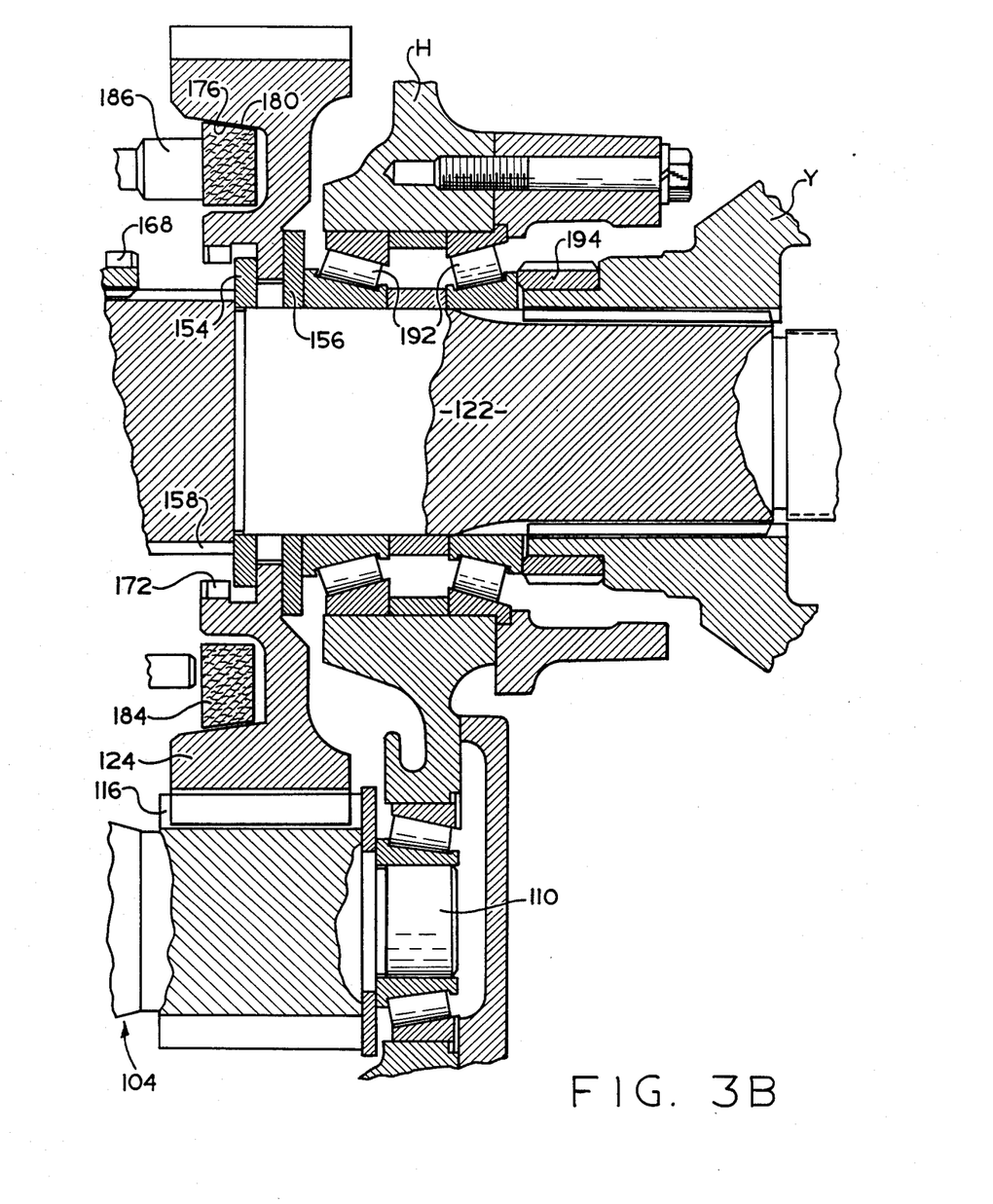

Referring to FIGS. 2 and 3, a compound change gear mechanical transmission 100 including the improved auxiliary transmission section 102 of the present invention may be seen. Change gear transmission 100 is an eighteen forward speed transmission comprising a main transmission section 12A, identical, or substantially identical, to main transmission section 12 described above in reference to prior art transmission 10. Main transmission section 12A of transmission 100 differs from main transmission section 12 of transmission 10 only in that mainshaft 28A extends slightly further into the auxiliary transmission section 102 then does main shaft 28 extend into auxiliary transmission section 14. In view of the substantially identical structure of main transmission sections 12 and 12A, main transmission section 12A will not be described again in detail.

While the auxiliary transmission section 102 of the present invention is particularly well suited for use in connection with main transmission sections such as sections 12 or 12A, the auxiliary section 102 of the present invention is also suited for use in connection with main transmissions of many other types.

Auxiliary transmission section 102 includes two substantially identical auxiliary countershaft assemblies 104 and 104A, each comprising an auxiliary countershaft 106 supported by bearings 108 and 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer and auxiliary section countershaft gears 116 and range gear 124 define a third layer, or gear group of the combined splitter and range type auxiliary transmission section 102.

A sliding two position jaw clutch collar 126 is utilized to selectively couple either the splitter gear 118 or the splitter/range gear 120 to the mainshaft 28A, while a two position synchronized assembly 128 is utilized to selectively couple the splitter/range gear 120 or the range gear 124 to the output shaft 122. The structure and function of double acting sliding jaw clutch collar 126 is substantially identical to the structure and function of sliding clutch collar 96 utilized in connection with transmission 10 while the structure and function of double acting synchronized clutch assembly 128 is substantially identical to the structure and function of synchronized clutch assembly 92 utilized in connection with transmission 10. Synchronized clutch assemblies such as assemblies 92 and 128 are well known in the prior art and examples thereof may be seen by reference to U.S. Pat. Nos. 4,462,489; 4,125,179 and 2,667,955, the disclosures of all of which are incorporated by reference.

The detailed structure of the preferred embodiment of auxiliary section 102 is illustrated in FIG. 3, wherein it may be seen that the rearward end of mainshaft 28A exteding into the auxiliary transmission section 102 is provided with external splines 130 which mate with internal splines 132 provided on clutch collar 126 for rotatioally coupling clutch collar 126 to the mainshaft 28A while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148 which are inclined at about 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 136 and 140 are provided with similar complementary tapered surfaces.

Splitter/range gear 120 is rotatably supported at the inward end 150 of output shaft 122 by means of a pair of thrust bearings 152 while range gear 124 surrounds the output shaft 122 and is axially retained thereon by means of thrust washers 154 and 156. Located axially between gears 120 and 124, and rotationally fixed to output shaft 122 by means of external splines 158 and internal splines 160, is the double acting two position synchronized clutch assembly 128. Many of the well known synchronized positive clutch structures are suitable for use in the auxiliary transmission section of the present invention. The synchronized clutch assembly 128 illustrated is of the pin type described in above mentioned U.S. Pat. No. 4,462,489. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function as is well known in the prior art. Synchronizing assembly 128 may also include a plurality of spring pins (not shown) for providing initial engagement of the conical friction surfaces at the initiation of a clutch engagement operation.

Output shaft 122 is supported by bearings 192 in housing H and extends therefrom for attachment of a yolk member Y or the like which typically forms a portion of a universal joint for driving a propellor shaft to a differential or the like. The output shaft 122 may also carry a speedometer gear 194 and/or various sealing elements (not shown).

As may be seen by reference to FIGS. 2 and 3, by selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (counter shaft 28A) and output (output shaft 122) thereof. As was the case with transmission 10 described above, in compound transmission 100 the main section 12A provides a reverse and five potentially selectable forward speeds. However, one of these selectable forward gear ratios (gear 56) is often a creeper or low gear not intended to be used in the high range. Thus transmission 100 is properly designated as a $(4+1) \times (2) \times (2)$ type transmission providing 17 or 18 selectable forward speeds depending upon the desirability and/or practicality of splitting the low or creeper gear.

Figure 2A:
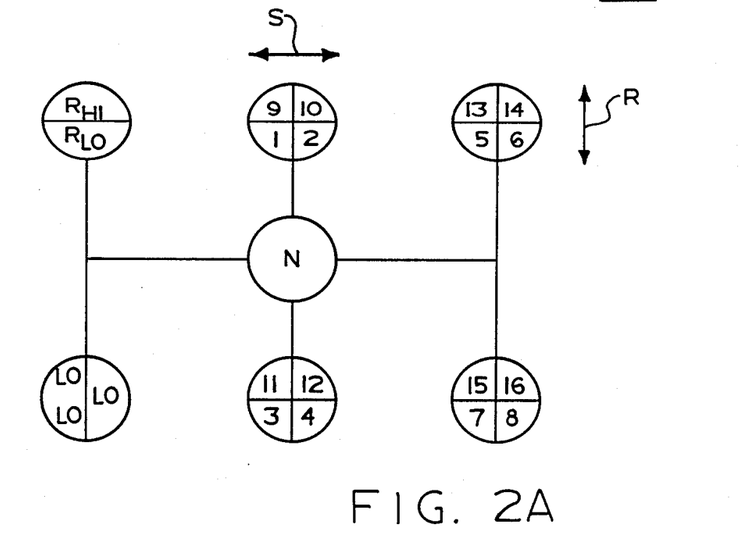
FIG. 2A is a schematic illustration of the shift pattern for the transmission of FIG. 2.

While clutch 128, the range clutch, should be a synchronized clutch, double acting clutch collar 126, the splitter clutch, is not required to be synchronized. Of course, one or both of the clutches defined by the collar 126 could be of the synchronized type. The shift pattern for shifting transmission 100 is schematically illustrated in FIG. 2A. As with FIG. 1A, divisions in the vertical direction illustrate range shifts while divisions in the horizontal direction illustrate splitter shifts.

Figure 4:
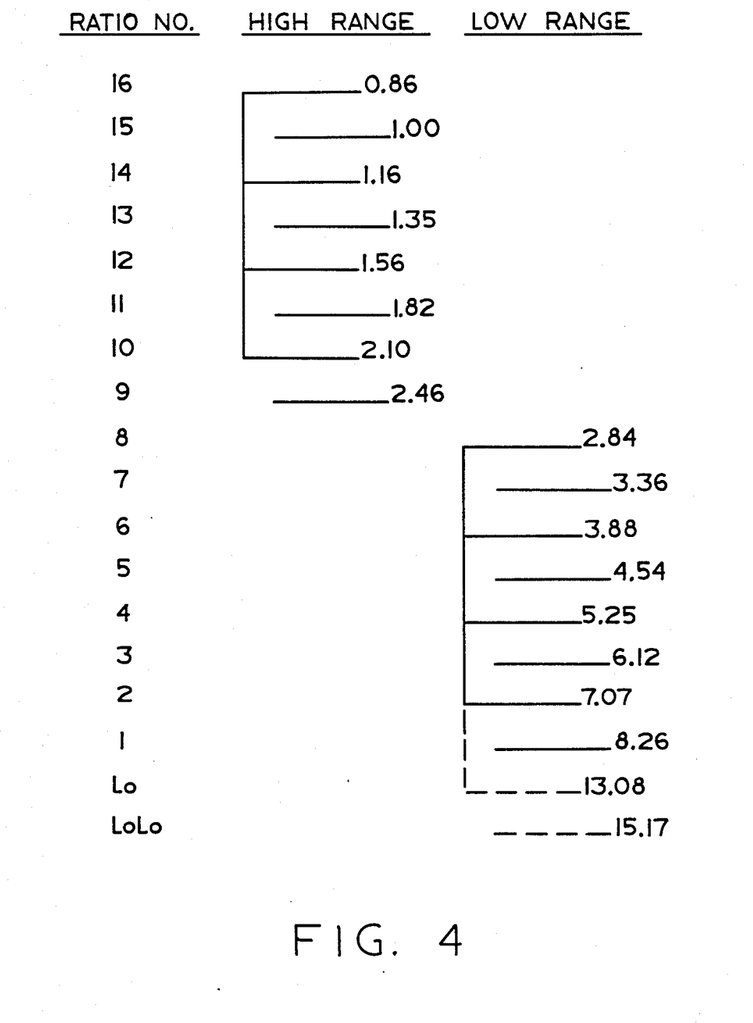
FIG. 4 is a chart illustrating typical ideal ratios for a compound change gear transmission of the type illustrated in FIGS. 2 and 3.

A method of selecting desirable gear ratios is schematically illustrated by reference to FIG. 4. Disregarding the creeper (illustrated in dashed lines) and reverse ratios, and assuming that it is desirable that a transmission have generally equal ratio steps, the main section ratio steps should be generally equal, the splitter step should be generally equal to the square root of the main section ratio steps and the range step should equal about the main section ratio step raised to the N power where N equals the number of main section ratio steps occurring in both ranges (i.e. N=4 in the (4+1)×(2)×(2) transmission). Given the desired ideal ratios, gearing to approximate these ratios is selected.

Referring to FIGS. 2 and 3, and assuming by way of example that gears 118, 120, 124, 112, 114 and 116, respectively, have 40, 38, 54, 41, 45 and 19 teeth each, respectively, the following four auxiliary section ratios are obtainable:

1. Clutch 126 engaged to gear 120 and clutch 128 engaged to gear 124 provides an auxiliary section reduction of about 3.365:1;

2. Clutch 126 engaged to gear 118 and clutch 128 engaged to gear 124 provides an auxiliary section reduction of about 2.913:1;

3. Clutch 126 engaged to gear 120 and clutch 128 engaged to gear 120 provides an auxiliary section reduction about 1.000:1; and 4. Clutch 126 engaged to gear 118 and clutch 128 engaged to gear 120 provides an auxiliary section reduction of about 0.865:1.

Figure 5:
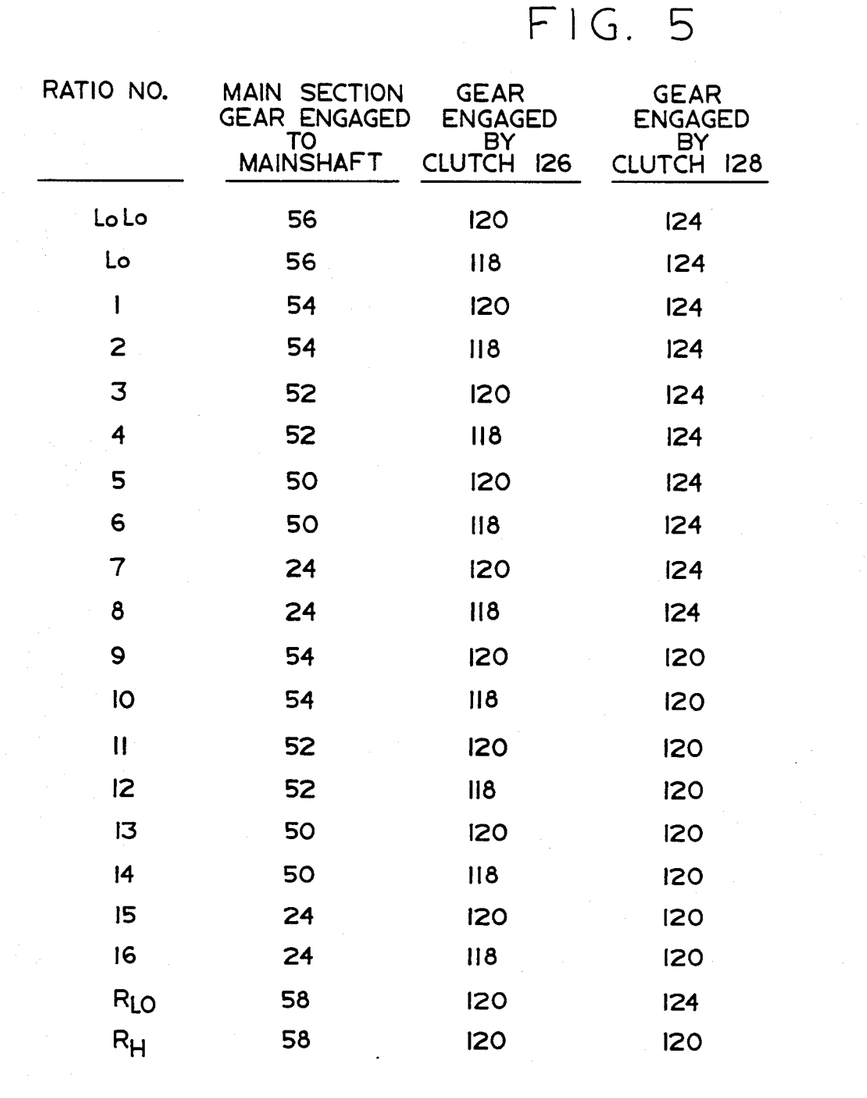
FIG. 5 is a chart illustrating the clutch positions for the various selectable ratios of a compound transmission of the type illustrated in FIGS. 2 and 3.

In the above example, the splitter steps are about 15.6% while the range step is about 336.6% which is generally suitable for a "4+1" main transmission section having about 35% steps as the square root of 1.35 equals about 1.16 and 1.35 raised to fourth power (i.e. N=4) equals about 3.32. FIG. 5 illustrates the various gears engaged for the various selectable forward speeds of transmission 100. It is noted that 8-9 and 9-8 shifts are extremely complex as a main section shift as well as a combined range and splitter auxiliary section shift is required.

The above example illustrates an "overdrive" type transmission. As is known in the transmission art, a "direct drive" transmission may be provided utilizing the auxiliary transmission section of the present invention by reversing the splitter and splitter/range gear sets and also reversing the sequence of operation of splitter clutch 126. By way of example, for such a transmission, gears 118, 120, 112 and 114 would have 38, 40, 45 and 41 teeth each, respectively, and splitter clutch 126 would engage gear 118 in gear ratios 1, 3, 5, 7, 9, 11, 13, 15 and gear 120 in gear ratios 2, 4, 6, 8, 10, 12, 14 and 16. Such a transmission would, by way of example, provide the same splitter step as discussed above but a somewhat smaller range step. Of course, by modifying the numbers of teeth on the various auxiliary section gears, acceptable range and splitter steps may be provided.

Accordingly, it may be seen that an improved auxiliary section having three gear-layers, combined range and splitter type gearing and four distinct selectable auxiliary section ratios is provided.

The description of the preferred embodiments of the present invention is by way of example only and various modifications and/or rearrangement of the parts are contemplated without departing from the spirit and the scope of the invention as hereinafter claimed.

I claim:

1. A combined range and splitter type auxiliary transmission section for a compound change gear transmission comprising a main transmission section connected in series with an auxiliary transmission section, said auxiliary transmission section comprising a housing, an auxiliary section input shaft extending into said housing and driven by said main transmission section and an output shaft extending from said housing, said auxiliary transmission section characterized by:

a splitter gear, a splitter/range gear and a range gear all generally coaxial with and rotatable relative to said auxiliary section input shaft and said output shaft;

an auxiliary section countershaft assembly comprising an auxiliary countershaft rotationally supported in said housing, a first auxiliary countershaft gear rotationally fixed to said auxiliary countershaft and constantly meshed with said splitter gear, a second auxiliary countershaft gear rotationally fixed to said auxiliary countershaft and constantly meshed with said splitter/range gear and a third auxiliary countershaft gear rotationally fixed to said auxiliary countershaft and constantly meshed with said range gear;

a two-position splitter clutch assembly fixed for rotation with said auxiliary section input shaft and having a first position for coupling said splitter gear to said auxiliary section input shaft and a second position for coupling said splitter/range gear to said auxilliary section input shaft;

a two-position range clutch assembly fixed for rotation with said output shaft and having a first position for coupling said splitter/range gear to said output shaft and a second position for coupling said range gear to said output shaft; and control means for independently positioning each of said splitter clutch assembly and range clutch assembly in a selected one of the two positions thereof.

2. The auxiliary transmission section of claim 1 wherein said range clutch assembly is a synchronized clutch for both positions thereof.

3. The auxiliary transmission section of claim 2 wherein said splitter clutch assembly is a nonsynchronized two-position double acting clutch.

4. The auxiliary transmission section of claim 1 wherein said main transmission section includes a transmission input shaft and provides a plurality of selectable forward speed ratios, having substantially equal ratio steps, between the transmission input shaft and said auxiliary section input shaft, and wherein:

(A/D)×(E/B) is generally equal to the square root of the average main transmission section ratio step, and (C/F)×(E/B) is generally equal to the average main transmission section ratio step raised to the N power, wherein:

A = number of teeth on the splitter gear,
B = number of teeth on the splitter/range gear,
C = number of teeth on the range gear,
D = number of teeth on the first auxiliary countershaft gear,
E = number of teeth on the second auxiliary countershaft gear,
F = number of teeth on the third auxiliary countershaft gear, and
N = number of selectable main transmission section forward ratios utilized in both the high and the low ranges.

5. The auxiliary transmission section of claim 2 wherein said main transmission section provides a plurality of selectable forward speed ratios, having substantially equal ratio steps, between the transmission input shaft and said auxiliary transmission input shaft, and wherein:

$(A/D) \times (E/B)$ is generally equal to the square root of the average main transmission section ratio step, and $(C/F) \times (E/B)$ is generally equal to the average man transmission ratio step raised to the N power, wherein:

A=number of teeth on the splitter gear,
B=number of teeth on the splitter/range gear,
C=number of teeth on the range gear,
D=number of teeth on the first auxiliary countershaft gear,
E=number of teeth on the second auxiliary countershaft gear,
F=number of teeth on the third auxiliary countershaft gear, and
N=number of selectable main transmission section forward ratios utilized in both the high and the low ranges.

6. The auxiliary transmission section of claim 3 wherein said main transmission section provides a plurality of selectable forward speed ratios, having substantially equal ratio steps, between the transmission input shaft and said auxiliary transmission input shaft, and wherein:

$(A/D) \times (E/B)$ is generally equal to the square root of the average main transmission section ratio step, and $(C/F) \times (E/B)$ is generally equal to the average main transmission ratio step raised to the N power, wherein:

A=number of teeth on the splitter gear,
B=number of teeth on the splitter/range gear,
C=number of teeth on the range gear,
D=number of teeth on the first auxiliary countershaft gear,
E=number of teeth on the second auxiliary countershaft gear,
F=number of teeth on the third auxiliary countershaft gear, and
N=number of selectable main transmission section forward ratios utilized in both the high and the low ranges.

7. The auxiliary transmission section of claim 5 wherein both said splitter and range clutch assemblies include a double-sided positive clutch member having positive clutch teeth on opposite axial ends thereof.

8. The auxiliary transmission section of claim 5 wherein both said auxiliary and main transmission sections are enclosed in a unitary housing.

9. The auxiliary transmission of claim 5 wherein said auxiliary section input shaft comprises an extension of the main transmission section mainshaft.

10. The auxiliary transmission section of claim 9 wherein a plurality of substantially identical auxiliary countershaft assemblies are provided in substantially equal circumferential spacing about said output shaft.

11. The auxiliary transmission section of claim 10 wherein said splitter gear, splitter/range gear and range gear are mounted for radial movement relative to the axes of said auxiliary section input shaft and said output shaft.

12. The auxiliary transmission section of claim 2 wherein said main transmission section provides a plurality of selectable forward speed ratios, having substantially equal ratio steps, between the transmission input shaft and said auxiliary transmission input shaft, and wherein:

$(D/A) \times (B/E)$ is generally equal to the square root of the average main transmission section ratio step, and $(C/F) \times (E/B)$ is generally equal to the average main transmission ratio step raised to the N power, wherein:

A=number of teeth on the splitter gear,
B=number of teeth on the splitter/range gear,
C=number of teeth on the range gear,
D=number of teeth on the first auxiliary countershaft gear,
E=number of teeth on the second auxiliary countershaft gear,
F=number of teeth on the third auxiliary countershaft gear, and
N=number of selectable main transmission section forward ratios utilized in both the high and the low ranges.

13. The auxiliary transmission section of claim 3 wherein said main transmission section provides a plurality of selectable forward speed ratios, having substantially equal ratio steps, between the transmission input shaft and said auxiliary transmission input shaft, and wherein:

$(D/A) \times (B/E)$ is generally equal to the square root of the average main transmission section ratio step, and $(C/F) \times (E/B)$ is generally equal to the average main transmission ratio step raised to the N power, wherein:

A=number of teeth on the splitter gear,
B=number of teeth on the splitter/range gear,
C=number of teeth on the range gear,
D=number of teeth on the first auxiliary countershaft gear,
E=number of teeth on the second auxiliary countershaft gear,
F=number of teeth on the third auxiliary countershaft gear, and
N=number of selectable main transmission section forward ratios utilized in both the high and the low ranges.

14. The auxiliary transmission section of claim 12 wherein both said auxiliary and main transmission sections are enclosed in a unitary housing.

15. The auxiliary transmission of claim 12 wherein said auxiliary section input shaft comprises an extension of the main transmission section mainshaft.

16. The auxiliary transmission section of claim 15 wherein a plurality of substantially identical auxiliary countershaft assemblies are provided in substantially equal circumferential spacing about said output shaft.

17. The auxiliary transmission section of claim 16 wherein said splitter gear, splitter/range gear and range gear are mounted for radial movement relative to the axes of said auxiliary section input shaft and said output shaft.

* * * * *